(12) United States Patent
Yuan et al.

(10) Patent No.: US 9,448,722 B2
(45) Date of Patent: Sep. 20, 2016

(54) TEXT ENTRY INTO ELECTRONIC DEVICES

(75) Inventors: Shijun Yuan, Beijing (CN); Mikko Repka, Oulu (FI)

(73) Assignee: Nokia Technologies Oy, Espoo (FI)

( * ) Notice: Subject to any disclaimer, the term of this patent is extended or adjusted under 35 U.S.C. 154(b) by 2248 days.

(21) Appl. No.: 12/083,652

(22) PCT Filed: Oct. 15, 2005

(86) PCT No.: PCT/IB2005/003563
§ 371 (c)(1),
(2), (4) Date: Apr. 1, 2009

(87) PCT Pub. No.: WO2007/045938
PCT Pub. Date: Apr. 26, 2007

(65) Prior Publication Data
US 2009/0207143 A1    Aug. 20, 2009

(51) Int. Cl.
*G06F 3/0488* (2013.01)

(52) U.S. Cl.
CPC ....... *G06F 3/04886* (2013.01); *G06F 3/04883* (2013.01); *G06F 2203/04804* (2013.01)

(58) Field of Classification Search
None
See application file for complete search history.

(56) References Cited

U.S. PATENT DOCUMENTS

| | | | |
|---|---|---|---|
| 5,283,560 A | | 2/1994 | Bartlett |
| 5,559,942 A * | | 9/1996 | Gough et al. ................. 715/802 |
| 5,638,501 A | | 6/1997 | Gough et al. ................. 395/135 |
| 5,805,163 A | | 9/1998 | Bagnas |
| 6,072,489 A * | | 6/2000 | Gough et al. ................. 715/803 |
| 7,343,562 B2 * | | 3/2008 | Bonura et al. ................. 715/768 |
| 7,904,823 B2 * | | 3/2011 | Beauchamp et al. ......... 715/768 |
| 2003/0001899 A1 * | | 1/2003 | Partanen et al. .............. 345/800 |
| 2003/0071850 A1 * | | 4/2003 | Geidl ............................ 345/781 |
| 2003/0214540 A1 | | 11/2003 | Huapaya et al. |
| 2004/0216036 A1 * | | 10/2004 | Chu et al. .................. 715/501.1 |
| 2005/0273700 A1 * | | 12/2005 | Champion et al. ........... 715/512 |
| 2006/0059437 A1 * | | 3/2006 | Conklin ........................ 715/800 |
| 2006/0107225 A1 * | | 5/2006 | Jones et al. ................... 715/764 |

FOREIGN PATENT DOCUMENTS

EP    0344082    11/1995
WO    WO 98/37483 A1    8/1998

OTHER PUBLICATIONS

Korean Office Action issued on Dec. 14, 2009 in counterpart Korean patent application No. 10-2008-7011245 (6 pages), and English language translation thereof (5 pages).
Chinese Office Action issued Feb. 25, 2010 in parallel Chinese Patent Application No. 200580051842.9 (6 pages) and English translation thereof (6 pages).
Korean Office Action (2 pages) and English translation of Korean Office Action (3 pages) dated Oct. 29, 2010 in corresponding Korean Patent Application No. 2008-7011245 (5 pages total).
Office Action for Korean Application No. 2008-7011245; dated Dec. 24, 2012.
Search Report for European Application No. 05 806 227 dated Dec. 10, 2012.
International Search Report and Written Opinion from corresponding International Application No. PCT/IB2005/003563, dated May 30, 2006.

* cited by examiner

*Primary Examiner* — Amare Mengistu
*Assistant Examiner* — Sarvesh J Nadkarni
(74) *Attorney, Agent, or Firm* — Alston & Bird LLP

(57) ABSTRACT

A method of entering text into an electronic device 1 comprising a display 7, the method comprising: controlling 21 the display 7 to display one or more demarcated areas 51 having a transparent background 55; detecting 23 an input in one of the one or more demarcated areas 51; and in response to the detecting step controlling 25 the display 7 to display an opaque background 57 instead of a transparent background 55 for at least one of the one or more demarcated areas 51 for text entry.

23 Claims, 4 Drawing Sheets

TEXT ENTRY INTO ELECTRONIC DEVICES

FIELD OF THE INVENTION

Embodiments of the present invention relate to improved text entry for electronic devices. In particular, they relate to a method for text entry into an electronic device, an electronic device, and a computer readable medium embodying a program comprising program instructions for controlling an electronic device.

BACKGROUND TO THE INVENTION

In many languages handwriting recognition is the preferred method of entering text into an electronic device. In handwriting recognition a user draws a character on a touch sensitive area and a recognition engine recognizes the character which has been drawn and enters this character into the text.

It is known for devices to have a dedicated touch sensitive display area for text input and another dedicated area for displaying text that has been input. This is not an efficient use of the display. It would be beneficial to provide for text entry in a manner that makes better use of the display.

BRIEF DESCRIPTION OF THE INVENTION

According to one embodiment of the invention there is provided a method of entering text into an electronic device comprising a display, the method comprising: controlling the display to display one or more demarcated areas having a transparent background; detecting an input in one of the one or more demarcated areas; and in response to the detecting step controlling the display to display an opaque background instead of a transparent background for at least one of the one or more demarcated areas for text entry.

The same area of the display can therefore be used for both displaying text and entering text, which is an efficient use of the display.

The demarcated areas may be used to enter text using handwriting recognition.

Text and/or images may underlie at least a portion of at least one of the one or more demarcated areas such that when the demarcated area has a transparent background the underlying text and/or images are visible within the demarcated area. When a demarcated area has an opaque background the underlying text and or/images are not visible in the demarcated area.

This provides the advantage that when the demarcated areas are not in use the user can see all of the information underlying the demarcated area so, for example, the user can read any text which has been entered.

When the demarcated area is in use it has a substantially uniform opaque background so that the underlying information on the display cannot be seen and the user can clearly see the text input in the demarcated area and is not distracted by the underlying information. This allows the user to write more clearly and may improve the chances of the recognition engine correctly recognizing the handwritten character.

According to an embodiment, an electronic device is provided comprising: a display for displaying one or more demarcated areas; a user input for text entry via the one or more demarcated areas; a detector for detecting an input via the user input in one of the one or more demarcated areas; and a control for controlling the display, wherein the control is arranged to control the display to display the one or more demarcated areas with a transparent background and is arranged, in response to detection of an input by the detector, to control the display to display at least one of the one or more demarcated areas with an opaque background instead of a transparent background.

According to an embodiment of the invention there is also provided an electronic device comprising: a display for displaying one or more demarcated areas; a user input for text entry via the one or more demarcated areas; detection means for detecting an input via the user input in one of the one or more demarcated areas; and control means for controlling the display, wherein the control means is arranged to control the display to display the one or more demarcated areas with a transparent background and is arranged, in response to detection of an input by the detection means, to control the display to display at least one of the one or more demarcated areas with an opaque background instead of a transparent background.

According to an embodiment of the invention there is also provided a computer readable medium having program instructions stored thereon for controlling an electronic device comprising a display which instructions, when loaded into a processor, are for controlling the display to display one or more demarcated areas having a transparent background; and for controlling the display to display an opaque background instead of a transparent background for at least one of the one or more demarcated areas for text entry in response to detection of an input in one of the one or more demarcated areas.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
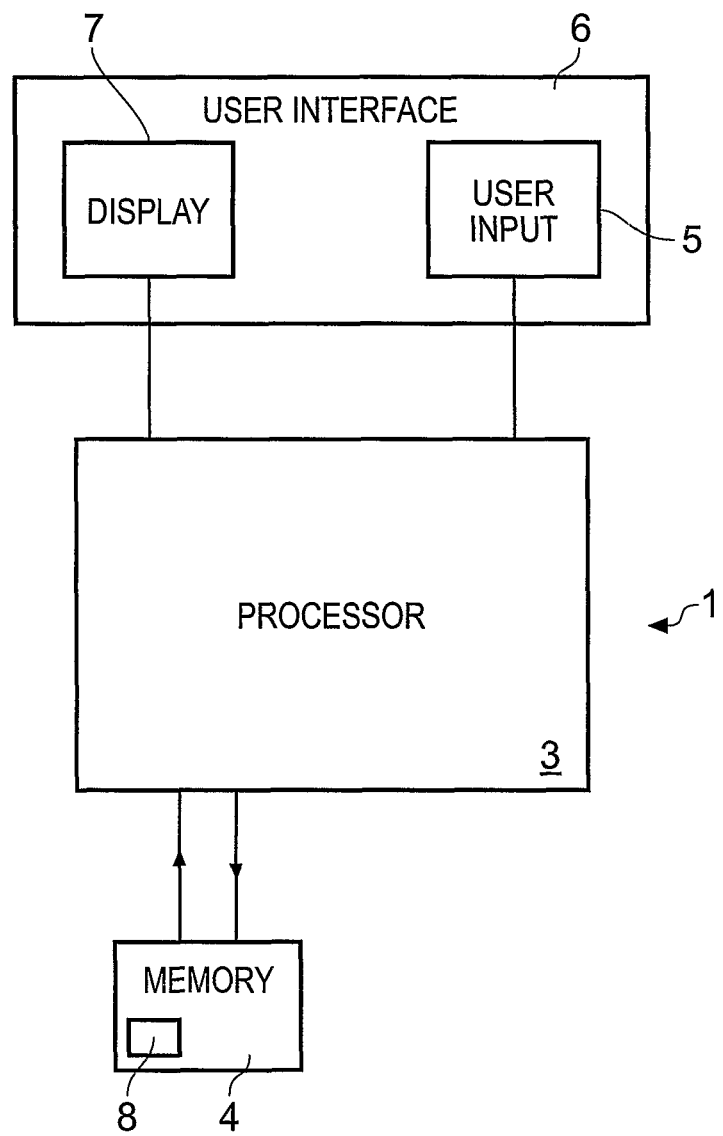
FIG. 1 illustrates an electronic device.

The Figures illustrate a method of entering text into an electronic device 1 comprising a display 7, the method comprising: controlling 21 the display 7 to display one or more demarcated areas 51 having a transparent background 55; detecting 23 an input in one of the one or more demarcated areas 51; and controlling 25 the display 7 to display an opaque background 57 instead of a transparent background 55 for at least one of the one or more demarcated areas 51 for text entry.

FIG. 1 illustrates an electronic device 1 according to an embodiment of the invention. The device 1 comprises a processor 3, a memory 4 and a user interface 6 comprising a user input 5 and a display 7. The electronic device 1 may be, for example, a mobile radio telephone, a personal computer, a tablet PC or a personal digital assistant. The device 1 may comprise other circuitry for example transceiver circuitry to enable it to operate as a mobile radio telephone.

The processor 3 controls the electronic device 1 and can read to and write from the memory 4.

The memory 4 stores computer program instructions 8 that control the operation of the electronic device 1 when loaded into the processor 3. The computer program instructions 8 provide the logic and routines that enables the electronic device to perform the methods illustrated in FIGS. 2 to 7.

The computer program instructions 8 provide means for controlling 21 the display 7 to display one or more demarcated areas 51 having a transparent background 55, means for detecting 23 an input in one of the one or more demarcated areas 51 and means for controlling 25 the display 7 to display an opaque background 57 instead of a transparent background 55 for at least one of the one or more demarcated areas 51 for text entry.

The computer program instructions 8 may arrive at the electronic device 1 via an electromagnetic carrier signal or be copied from a physical entity such as a computer program product, a memory device or a record medium such as a CD-ROM or DVD.

The display 7 displays information to a user. The information may be text and/or images. The information may include information which has been input by a user using the user input 5.

The user input 5 may comprise more than one type of user input device. Preferably the user input 5 comprises an area which is arranged for text entry by handwriting recognition. This may be a touch sensitive area on the display 7. The user input 5 may also comprise a key pad or joystick or other input device in addition to a touch sensitive area of display 7. The user input 5 can be used to enter information into the processor 3 which may then be displayed on the display 7.

FIGS. 2 to 6 illustrate a method of entering text into an electronic device according to an embodiment of the present invention.

Figure 3:
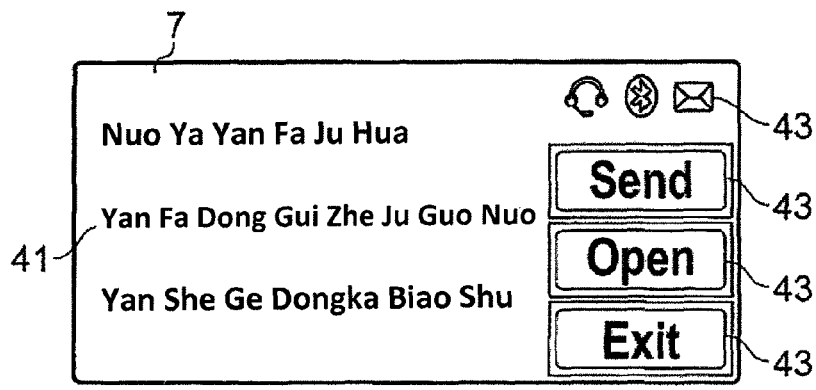
FIG. 3 illustrates a display according to an embodiment of the present invention.

FIG. 3 illustrates a display 7 of the device 1, when the device is in a text entry mode. The display shows text 41 which is being augmented by a user. This text 41 may have been previously entered by the user e.g. using input means such as a key pad or it may be loaded from a stored file. The display 7 also displays icons 43, which when selected cause the device 1 to perform certain functions, for example, sending a message or exiting text entry mode.

When the user wishes to enter a character using handwriting recognition the user must change the mode of the device 1 into a handwriting recognition mode. This may be achieved, for example, by selecting an icon 43 on the display 7 or pressing a key on the device 1.

Figure 2:
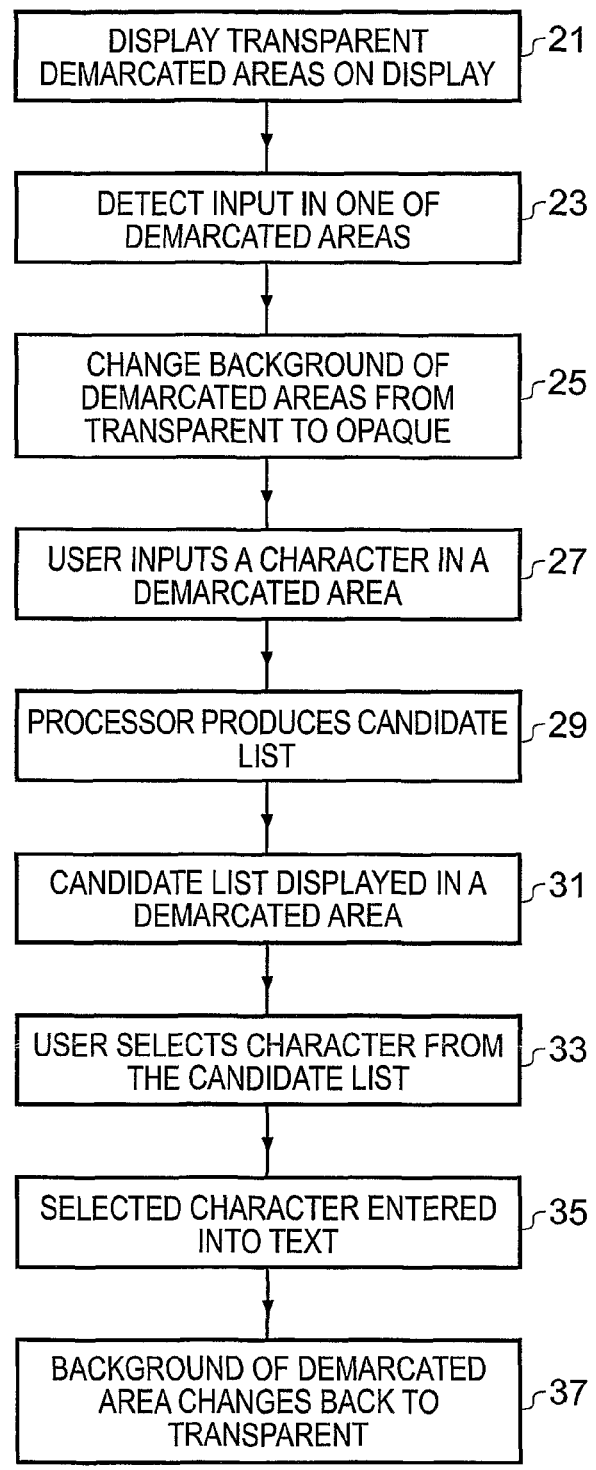
FIG. 2 is a flow chart showing the method steps of the present invention.
Figure 4:
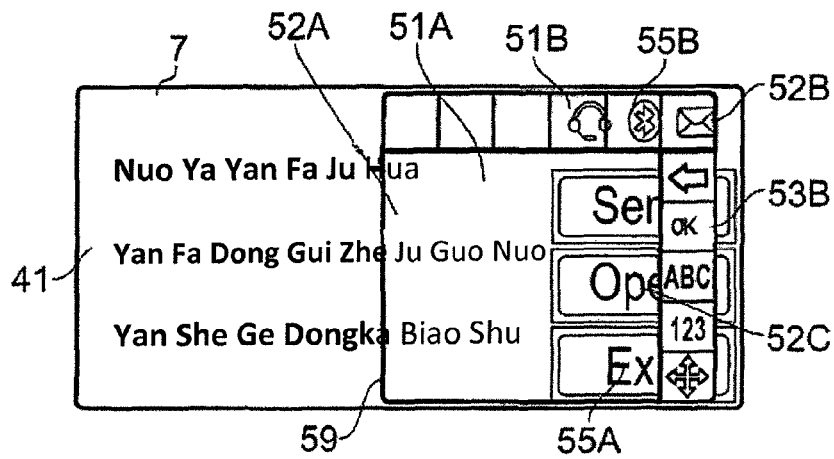
FIG. 4 illustrates a display displaying demarcated areas with transparent backgrounds.

When the device 1 is in a handwriting recognition mode the processor 3, in step 21 of FIG. 2, controls the display 7 to display one or more demarcated areas 51 having transparent backgrounds 55 as illustrated in FIG. 4. In the example of FIG. 4, a demarcated area 51 is distinguished from the rest of the display 7 by a solid line boundary 59 which surrounds most, or all, of the demarcated area 51. In other embodiments the demarcated areas 51 may be distinguished from the rest of the display 7 by being a different color.

The text 41 and icons 43 underlie portions 52A, 52B and 52C of the demarcated areas 51A and 51B however they are still clearly visible through the transparent backgrounds 55A and 55B of the demarcated areas 51A and 51B.

There are, in this example, two demarcated areas 51A and 51B. The first demarcated area 51A is operable as a recognition area in which the user can write a character. The second demarcated area 51B is operable as a candidate list area to display potential character selections to a user. Other embodiments may have different numbers of demarcated areas 51.

In some embodiments the demarcated areas 51 may be moveable individually and/or collectively within the display 7 by a user.

The display 7 also displays icons 53 which allow a user to choose the type of characters they wish to enter. In this embodiment the user can enter either Chinese characters, Roman characters or Arabic numerals. Preferably the user can also enter any type of symbol for example punctuation marks and numerical symbols.

Figure 5:
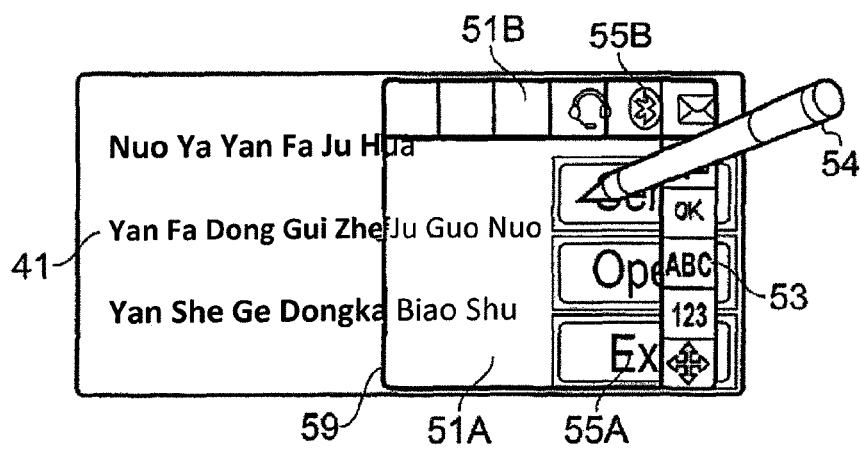
FIG. 5 illustrates a user using the demarcated areas to input a character.
Figure 6:
FIG. 6 illustrates a display displaying demarcated areas with opaque backgrounds.

FIG. 5 illustrates a user using a stylus 54 to input a character in the recognition area 51A. The processor detects 23 an input at the recognition area 51A in step 23 of FIG. 2. In this example, the detection occurs when the stylus 54 touches the recognition area 51A. In response to this detection, the processor 3, at step 25 of FIG. 2, controls the display 7 to change the transparent backgrounds 55A and 55B of both of the demarcated areas 51A and 51B to opaque backgrounds 57A and 57B. The opaque backgrounds 57A and 57B are substantially uniform as illustrated in FIG. 6.

When the demarcated areas 51 have opaque backgrounds 59 the underlying text 41 and images 43 on the display cannot be seen. This gives the user a blank uniform background to write upon and prevents the user being distracted by any underlying information. This allows the user to write more clearly and improves the chances of the processor 3 correctly recognizing the character being input.

Next, at step 27 of FIG. 2, the user uses the stylus 54 to write 27 a character in the recognition area 51A. At step 29 of FIG. 2, the processor 3 guesses which character the user is writing and creates a list of potential characters. This guess is based upon the inputs detected in the recognition area 51A and any previously entered characters. Then at step 31 of FIG. 2, the processor 3 controls the display 7 to display the candidate list 56 in the second demarcated area 51B. The resultant display 7 is illustrated in FIG. 6.

Then at step 33 of FIG. 2, the user selects a character from the candidate list 56. To select a character the user may, for example, touch the character in the candidate list 56 with the stylus 54. At step 35 of FIG. 2, the processor 3 detects which one of the candidate characters has been selected by the user and the selected character is entered 35 into the text 41. Once the selected character has been entered into the text the processor 3, at step 37 of FIG. 2, controls the display 7 so that the opaque backgrounds 59A and 59B of the demarcated areas 51A and 51B change 37 back to transparent backgrounds 55A and 55B returning the display to a form similar to that illustrated in FIG. 4 except for an additional character at the end of the entered text 41. The transparency of the demarcated areas allows the user to see the whole of the text which has been input.

In the embodiment described above the background of both the recognition area 51A and the candidate list area 51B change from transparent to opaque at the same time. In other embodiments only the background of recognition area 51A may change to opaque at step 25 when the user begins to write. The background of the candidate list area 51B may only change after the processor has created the candidate list at step 29, so that the candidate characters displayed for selection in step 31 are displayed in an opaque background.

Also in this embodiment the processor 3 controls the display 7 so that the opaque backgrounds 57A, 57B of the demarcated areas 51A, 51B change back to transparent backgrounds 55A, 55B, at step 35, after the character has been input.

In other embodiments the backgrounds may change back to transparent after a predetermined time.

Figure 7:
FIG. 7 illustrates a display showing demarcated areas according to a second embodiment of the invention.

FIG. 7 illustrates a second embodiment of the invention. In this embodiment only the background of the candidate list area 51B changes when the user inputs a character. The background of the recognition area 51A remains transparent.

In the embodiments illustrated the method is used to enter Chinese characters. The device could be used to enter any type of characters.

Although embodiments of the present invention have been described in the preceding paragraphs with reference to various examples, it should be appreciated that modifications to the examples given can be made without departing from the scope of the invention as claimed.

While endeavoring in the foregoing specification to draw attention to those features of the invention believed to be of particular importance it should be understood that the Applicants claim protection in respect of any patentable feature or combination of features hereinbefore referred to and/or shown in the drawings whether or not particular emphasis has been placed thereon. Likewise, while there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A method of entering text into an electronic device comprising a display, the method comprising:
   controlling the display to display one or more demarcated areas transparently so that underlying text is visible as a background display of already entered text;
   detecting an input in one of the one or more demarcated areas; and
   in response to the detected input, controlling the display to display the one or more demarcated areas opaquely so the background text is at least in part not visible while text is entered by a user.

2. A method as claimed in claim 1, wherein at least one of the one or more demarcated areas are used for text entry using handwriting recognition.

3. A method as claimed in claim 1, wherein demarcation of a demarcated area is provided by a boundary region to the demarcated area.

4. A method as claimed in claim 1, providing text or an image, or both underlying at least a portion of at least one of the one or more demarcated areas such that when a demarcated area has underlying background text, or image, or both, such are visible within the demarcated area while text is not being entered by the user.

5. A method as claimed in claim 1, comprising controlling the display to display the background for at least one of the one or more demarcated areas while text is entered by the user.

6. A method as claimed in claim 1, wherein the one or more demarcated areas are moveable around the display.

7. A method as claimed in claim 1, wherein a first area of the one or more demarcated areas is operable as a recognition area for recognizing characters written by a user and a second area of the one or more demarcated areas is operable as a candidate list for displaying potential character selections to a user.

8. A method as claimed in claim 7, wherein the input is detected in the first area.

9. A method as claimed in claim 8, wherein the background of both the first area and the second area changes from being visible to not being visible when an input is made in the first area.

10. A method as claimed in claim 8, wherein only the background of the first area changes from being visible to not being visible when an input is made in the first area.

11. A method as claimed in claim 10, wherein the background of the second area changes from being visible to not being visible when a potential character for selection is displayed to a user.

12. A method as claimed in claim 1, wherein text entry in the one or more demarcated areas is input in a foreground of the one or more demarcated areas so that it is silhouetted/contrasted against an opaque background.

13. Apparatus comprising:
    a processor; and
    memory including computer program instructions,
    the memory and the computer program instructions configured to, with the processor, cause the apparatus at least to perform:
    display one or more demarcated areas responsive to user input for text entry by a user via the one or more demarcated areas;
    detect an input via the user input in one of the one or more demarcated areas; and
    control the display to display the one or more demarcated areas transparently so that existing background text information is visible before the user input is detected and, in response to detection of the user input, to display at least one of the one or more demarcated areas opaquely so the existing background text information is at least in part not visible while text is entered by the user.

14. An apparatus as claimed in claim 13 wherein at least one of the one or more demarcated areas are operable for text entry using handwriting recognition.

15. An apparatus as claimed in claim 13 wherein demarcation of a demarcated area is provided by a boundary region to the demarcated area.

16. An apparatus as claimed in claim 13, wherein the one or more demarcated areas are moveable around the display.

17. An apparatus as claimed in claim 13, wherein a first area of the one or more demarcated areas is operable as a recognition area for recognizing characters written by the user and a second area of the one or more demarcated areas is operable as a candidate list for displaying potential character selections to the user.

18. An apparatus as claimed in claim 17 operable to detect an input in the first area.

19. An apparatus as claimed in claim 18 wherein the background of both the first area and the second area changes from being visible to not being visible when an input is made in the first area.

20. An apparatus as claimed in claim 17 wherein the background of the second area changes from being visible to not being visible when the display displays a potential character selection.

21. An apparatus as claimed in claim 13 wherein the text entry in a demarcated area is input in a foreground so that it is silhouetted/contrasted against an opaque background.

22. A non-transitory computer readable medium having program instructions stored thereon for controlling an electronic device comprising a display which program instructions, when loaded into a processor, are for controlling the display to display one or more demarcated areas transparently so that underlying text is visible as a background display of already entered text, and for controlling the display the one or more demarcated areas opaquely so the background text is at least in part not visible while text is entered by a user.

23. A computer program product embodying the computer readable medium as claimed in claim 22.

* * * * *